United States Patent
Walton

[15] 3,656,713
[45] Apr. 18, 1972

[54] FREE TURNING TIE NUT AND PLUG VALVE

[72] Inventor: Richard C. Walton, Hollywood, Calif.

[73] Assignee: Annelie Hoyer Walton, Hollywood, Los Angeles County, Calif. a part interest

[22] Filed: May 1, 1970

[21] Appl. No.: 33,821

[52] U.S. Cl.................................................251/309
[51] Int. Cl..................................................F16k 5/02
[58] Field of Search.................251/309, 310, 311, 312, 315

[56] References Cited

UNITED STATES PATENTS

| | | | |
|---|---|---|---|
| 2,664,263 | 12/1953 | Stadler | 251/309 X |
| 3,093,358 | 6/1963 | Wakeman | 251/309 |
| 2,885,179 | 5/1959 | Hartmann | 251/315 |
| 3,151,837 | 10/1964 | Bentley-Leek | 251/315 X |
| 3,214,135 | 10/1965 | Hartmann | 251/315 |
| 3,218,024 | 11/1965 | Kroekel | 251/315 X |
| 3,252,684 | 5/1966 | Ksieski | 251/309 X |
| 3,384,337 | 5/1968 | Brown | 251/309 X |
| 3,467,356 | 9/1969 | Mueller | 251/309 X |
| 3,508,573 | 4/1970 | Smith | 251/309 X |

Primary Examiner—Samuel Scott
Attorney—Allan D. Mockabee

[57] ABSTRACT

A free turning plug valve and tie nut wherein the plug is retained in the valve housing by a threaded retainer which rotates in an antifriction bearing and the retainer engages an abutment positively limiting the tightening action of the retainer; and wherein the plug or the wall of the housing in which it oscillates has a friction reducing plastic surface, which in cooperation with the controlled tightening means prevents binding of the plug in the housing.

5 Claims, 2 Drawing Figures

RICHARD C. WALTON
INVENTOR

BY
*Allan D. Huckabee*
ATTORNEY

FREE TURNING TIE NUT AND PLUG VALVE

This invention relates to a free turning plug valve and tie nut and more particularly, it is applicable to valves of fairly large size which must be capable of efficient sealing against leakage and which under present circumstances, and with present constructions, frequently results in binding of the valve plug in the housing so tightly that it is quite difficult to turn the plug.

One of the objects of the invention is to provide a plug valve in which the plug is tapered and the reduced end connected to some tightening means, such as a free turning tie nut, wherein the tie nut can be securely tightened and yet wherein means is provided for insuring free rotation of the plug.

More specifically, it is an object to provide between the portion of the plug to which the tie nut is connected, and the housing, suitable antifriction means for insuring free rotation of the plug.

A further object of the invention is to provide a valve of the type described wherein the plug is maintained in a freely rotatable condition, and yet wherein a proper seal against the leakage of fluids is maintained between the plug and the housing.

Still another object of the invention is to provide a plug of the type described wherein either the side wall of the plug, or the wall portion of the housing which defines the plug cavity, is of a low friction plastic material so that even when the plug is tightened in its cavity up to a predetermined maximum, the plastic surface, as well as the antifriction mounting for the plug retaining means, will insure proper rotation of the plug as well as to prevent leakage.

Another object is to provide a plug valve wherein the plug is supported by an antifriction bearing which is sealed and will satisfy sanitary requirements, such as those incident to their use in dairies and other food plants.

Another object is to provide an improved free turning tie nut construction.

The above and other objects will more fully appear from the following description in connection with the accompanying drawing.

Figures 1, 2:
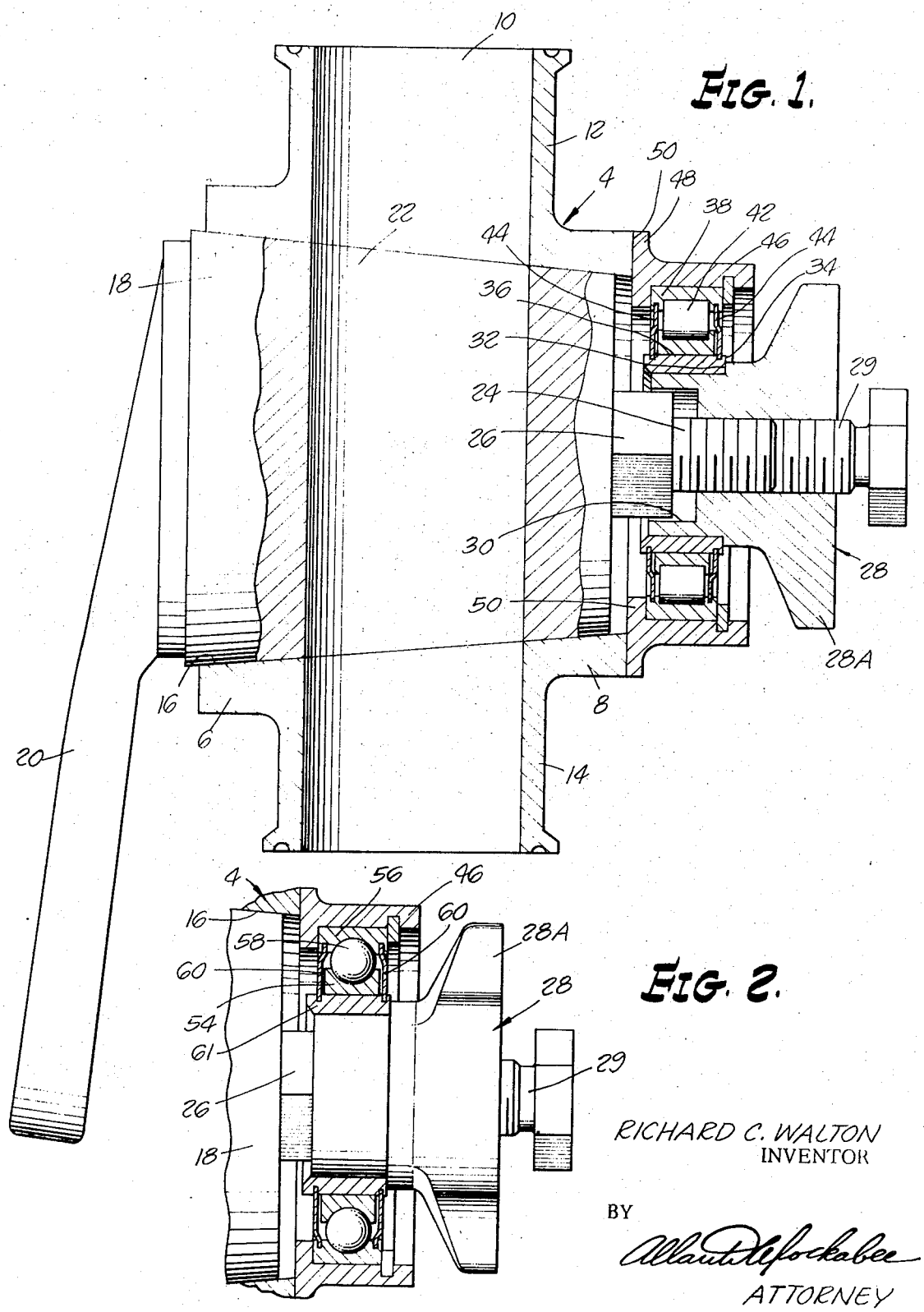
FIG. 1 is a view partially in side elevation and partially in vertical section of an embodiment of the invention.
FIG. 2 is a fragmentary view partially in vertical section of a modified form of construction.

There is illustrated a valve including a housing 4 having a generally horizontal barrel defined by circular flanges 6 and 8. Flanges 6 and 8 lie at either side of a longitudinal flow passage 10 defined by upper and lower cylindrical portions 12 and 14. The flanges 6 and 8 on their inner sides define a frustoconical plug cavity 16 which intersects the flow passage 10 at right angles thereto.

In the cavity 16 is a valve plug 18 which is frustoconical in shape. Its larger end extends outwardly from the circular flange 6 and is provided with an operating handle 20. The medial portion of the plug 18 is provided with a circular passageway 22 which preferably is of the same size as the flow passage 10. The larger end of the plug 18 closely fits in the flange 6 and the smaller end closely fits in the flange 8.

Extending axially from the smaller end of the plug 18 is a threaded stem 24 having an enlarged base portion 26. Threaded on the stem 24 is a tie nut 28 whose left or inner end is recessed as at 30 to clear the enlargement 26 on the threaded stem 24. The wing nut 28 has an inner abutment face 32 adapted to engage the right side 34 of an inner bearing race 36.

Lying about the inner bearing race 36 and outwardly concentric thereto is an outer race 38. Between the races lie conventional bearing rollers 42. As shown, each side of the bearing unit comprising races 36 and 38 and rollers 42 are provided with seals 44. Around the outer roller race 38 and closely fitting the same, is a sleeve 46 having a flange 48 which is adapted to abut the end face 50 of the flange 8. Preferably, the outer roller race 38 is press fitted in the sleeve 46. Also, the inner race 36 of the roller bearing assembly is axially confined against movement to the right by an inwardly directed portion of the flange 48.

Threaded into the outer end of the nut 28 is an abutment screw 29 which is shown in FIG. 1 to abut the end of the threaded stem 24. This screw adjustably limits the extent to which the nut 28 can be turned onto the threaded stem 24, and also it limits the amount of pressure of the nut abutment face 32 against the bearing race 36, through the rollers 42, race 38 and sleeve 46 to the valve housing 4. This, of course, limits the degree to which the valve plug 18 is pulled into the cavity 16.

The screw 29 can be tightened against the stem 24 to lock the nut 28 in position. The rotary plug 18 is formed from a suitable friction reducing plastic material which will slide easily relative to the metal walls on the inner sides of flanges 6 and 8 which define the plug cavity 16.

When the valve is assembled as shown in FIG. 1, the tie nut 28 with its wings 28A can be tightened until its abutment face 32 clamps the roller bearing unit and its sleeve 46 between said face and the end face 50 of the flange 8. This pressure is sufficient to draw the plug 18 to the right in the cavity 16 in sufficiently intimate contact with the walls of said cavity to prevent leakage. A stop screw 29 is threaded through the nut 28 and its inner end abuts the end of the threaded stem 24 to limit the extent to which the nut 28 can be tightened and the plug 18 drawn into its cavity. The plug can be readily rotated by the usual handle 20 and rotation is facilitated, not only by the bearing unit, but also by reason of the plastic plug. The plastic functions much in the manner of a nylon bearing. It is also contemplated that I could use plastic coated metal plugs. While I would prefer to apply it to the plug 18, because it is more convenient to do so, it could be applied to the frustoconical walls defining the inner sides of the flanges 6 and 8, as well as that portion of the housing 12 which also defines the plug cavity 16.

In FIG. 2 there is shown a similar arrangement except that there are ball races 54 and 56 which confine ball bearings 58. At opposite sides of the two sets of ball bearings I provide seals 60 which efficiently seal against the admission of milk or other food liquids into the bearing and also against leakage of any liquids or other foreign substances from the interior of the bearing into the stream of milk or other liquid flowing through the passage 10 in the valve housing. The details of the seals 60 are not shown but it is to be understood that the inner ball race 54 is adapted to rotate with the tie nut 28 and sleeve 61 relative to the seals 60.

From the foregoing it will be seen that I have provided a plug valve which is capable of operating without leaking and yet which can be firmly retained in its cavity and housing by positive tightening or retaining means without causing the plug to bind in its cavity. With conventional types of plug valves they sometimes bind to the extent that the operating handles 20 are hammered on and broken, or the handles cannot be moved without the aid of an extension pipe inserted on the handle, which in turn results in damage or breakage thereto. It is a valve which is provided with antifriction bearings for freedom of movement wherein the bearings are properly isolated from the liquids flowing through the valve so that there is no possibility of contamination. Furthermore, the antifriction means provided by the bearings functions in conjunction with an antifriction surface provided either on the plug or the wall of the cavity in which the plug is received so that a smoothly acting and properly leakproof valve is produced.

It will of course be understood that various changes can be made in the form, details, arrangement and proportions of the various parts, without departing from the spirit of the invention.

I claim:

1. A plug valve including a housing having a fluid flow port therethrough, a frustoconical valve plug cavity intersecting said port, wherein the improvement comprises: a frustoconical valve plug in said cavity and having an axial stem on its smaller end, axially acting valve plug securing means on said axial stem, and antifriction means constituting at least part of the support for said valve plug and interposed between said plug stem and securing means on the one hand, and said housing on the other hand, said antifriction means comprising a pair of concentric bearing races, rotary antifriction bearing elements between said races, fluid seal means between the bearing races at each side of said bearing elements, means wherein one bearing race is rotatable relative to the other bearing race and the fluid seal means, means wherein said axial stem is threaded, and said axially acting valve plug securing means is threaded upon said axial stem, and said valve plug securing means having adjustable stop means limiting movement of said valve plug securing means on said threaded stem.

2. The structure as in claim 1, wherein said antifriction means comprises, a bearing assembly having a pair of concentric inner and outer races with rotary antifriction bearing elements mounted between said races, bearing assembly locating and supporting means interposed between one of said races and said housing, and said valve plug securing means being interposed between the other of said races and said stem and plug.

3. The structure in claim 1, wherein said valve plug includes a low friction plastic surface in rotary sliding contact with the inner surface of said cavity, said plastic surface and said antifriction means supporting the valve plug for turning movement free of metal-to-metal sliding contact with said housing.

4. The structure in claim 3, and said antifriction means comprising a pair of races, and roller bearing elements between the races.

5. The structure in claim 3, and means associated with one of said stem and securing means limiting axial tightening movement of the securing means.

* * * * *